United States Patent
Robertazzi et al.

[11] Patent Number: 5,889,989
[45] Date of Patent: Mar. 30, 1999

[54] LOAD SHARING CONTROLLER FOR OPTIMIZING MONETARY COST

[75] Inventors: Thomas G. Robertazzi, Mastic; Serge Luryi, Stony Brook, both of N.Y.; Jeeho Sohn, Monmouth, N.J.

[73] Assignee: The Research Foundation of State University of New York, Stony Brook, N.Y.

[21] Appl. No.: 714,696

[22] Filed: Sep. 16, 1996

[51] Int. Cl.⁶ .................................................. G06F 9/00
[52] U.S. Cl. .......................................... 395/675; 395/672
[58] Field of Search .................................. 395/672, 675, 395/670, 673, 671

[56] References Cited

U.S. PATENT DOCUMENTS 5,079,760  1/1992  Nemirovsky et al. .
5,392,429  2/1995  Agrawal et al. .................... 395/650

OTHER PUBLICATIONS

"Cost –Performance Analysis of Heterogeneity in Supercomputer Architectures", Daniel Menascé et al., Dep. of Science & Computer Univ. of Federal de Mines Gerais, IEEE 1990.

Alonso, "An experimental evaluation of load balancing strategies", *Miami Technicon'87*, vol. 21, No. 5, Oct. 1987, pp. 225–228.

Banawan et al., "A comparative study of load sharing in heterogeneous multicomputer systems", *25th Annual Simulation Symposium*, Apr. 1992, pp. 22–31.

Bataineh et al., "Bus–oriented load sharing for a network of sensor driven processors", *IEEE Transactions on Systems, Man and Cybernetics*, vol. 21, No. 5, Sep. 1991, pp. 1201–1205.

Bernard et al., "A survey of load sharing in networks of workstations", *Distributed Systems Engineering*, vol. 1, No. 2, pp. 75–86.

Bharadwaj et al., "Optimal Sequencing and Arrangement in Distributed Single–Level Tree Networks with Communication Delays", *IEEE Transactions on Parallel and Distributed Systems*, vol. 5, No. 9, Sep., 1994, pp. 968–976.

Cazabon et al., "A policy independent metric for process selection in distributed systems", *Nineteenth Annual International Computer Software and Applications Conference*, Aug. 1995, pp. 212–217.

Haddad, "Optimal load sharing in dynamically heterogenous systems", *Seventh IEEE Symposium on Parallel and Distributed Processing*, Oct. 1995, pp. 346–353.

Phillipe et al., "Distributed scheduling for multicomputers", *High–Performance computing and Networking Conference*, Apr. 1995, pp. 344–349.

Wang et al., "Load sharing in distributed systems", *IEEE Transactions on Computers*, vol. C–34, No. 3, Mar. 1985, pp. 204–217.

*Primary Examiner*—Majida A. Banankhah
*Attorney, Agent, or Firm*—Baker & Botts, L.L.P.

[57] ABSTRACT

A load sharing system which minimizes overall costs by assigning segments of a divisible load to distributed processors based on the monetary cost of each processor. The distributed processors are connected to a network such as a local area network or the internet. A controller divides a divisible load and assigns each segment of the load to a processor based on the processor's monetary cost which is a function of its operating cost and its processing speed. The allocation is then optimized by transferring portions of the load from the expensive processors to the cheaper processor while maintaining an acceptable finish time for all processing. The optimization can also be performed for minimizing the finish time of the processors within a cost constraint.

41 Claims, 4 Drawing Sheets

| PROCESSOR # | STATUS | COST/LOAD | SPEED |
|---|---|---|---|
| 1 | BUSY | $4 | 100 MHz |
| 2 | AVAILABLE | $6 | 120 MHz |
| 3 | AVAILABLE | $3 | 80 MHz |

FIG. 6

LOAD SHARING CONTROLLER FOR OPTIMIZING MONETARY COST

TECHNICAL FIELD

The present invention relates to a load sharing controller for optimizing the monetary cost of computation of the distributed processors within a networked system.

BACKGROUND OF THE INVENTION

Parallel processing techniques divide jobs among at least two separate processors to gain computational efficiencies when operating on a large group of data, called a load or job. It is often more efficient, where possible, to divide a job for concurrent processing among multiple processors in order to complete the computations in a shorter period of time. Loads to be processed can either be characterized as indivisible or divisible. An indivisible load is one that cannot be divided into two or more smaller fragments to be distributed among multiple processors but requires that the load be processed by a single processor. A divisible load is a load that can be arbitrarily partitioned in a linear fashion and can be distributed to more than one processor to achieve a faster solution time. An example of a divisible load is a very long linear data file associated with a simple operation such as the summation of a large set of numbers. Intermediate sums of the list of numbers can be computed on different distributed processors and then later recombined and added together to gain the final solution.

A more sophisticated example of a divisible load is data representing an input waveform which is to be applied to a series of digital filters to identify the waveform. The data can be segmented and processed on different processors in order to expedite the required computation period. In general, the class of divisible loads includes problems where a number of repetitive and independent operations are performed on very large data files. Examples of divisible loads commonly appear in the areas of signal processing, image processing and experimental data processing. Divisible load theory has the benefit of being completely deterministic without requiring any statistical or probabilistic assumptions.

When a divisible load is distributed to a number of processors, there is a need for a central controller, which can be one of the processors, to select which processor gets which portion of the load and in what order. One scheme is to assign the fastest processor (in terms of computational speed) with as much data as possible within a given time constraint. This speed based load sharing approach must take into account the number of available processors, the speed of each processor, the speed of the communication links, the load origination point and the network architecture.

Previous allocations of controllers have been based upon processor speed among networked processors in order to gain time efficiencies by parallel processing the divisible load. As computer hardware and communications technology are quickly advancing, an opportunity to link processors located at different remote sites together to compute a load is promising. The internet currently allows for the fast and cheap communication between processors irrespective of their physical locations. Indeed, the internet allows for worldwide communication on a relatively inexpensive basis.

Communication costs (e.g., telephone line charges) are one of the monetary costs associated with distributed processing. Different processors also have varied associated monetary costs themselves. One minute of processor time on a super-computer is many orders of magnitude more expensive to operate than on a simple 486 computer platform. Businesses now have the capability of renting out their idle processor time to other users when connected in a global network such as the internet. Ross Perot, founder of Electronic Data Systems of Texas, made a business out of renting idle time on private mainframe computer installations to run programming. The increased number of different types of processors with varied associated monetary costs creates a need for a load sharing controller which assigns divisible loads among distributed processors to minimize the overall monetary cost to process the load.

SUMMARY OF THE INVENTION

The present invention includes a controller for the allocation of divisible load jobs among a plurality of distributed processors based on their monetary costs. The system includes a plurality of processors and a network for connecting the distributed processors where one of the processors is a controller for dividing the computer job to be processed into segments and assigning the segments to the distributed processors based on each processor's associated monetary cost.

The monetary cost of a processor includes the operational cost of the processor itself and the platform upon which it runs. The monetary cost can also include a percentage of the purchase price of the computer platform so that the owner of the processor can recoup some of its initial investment. The controller determines the monetary cost of a distributed processor by either polling the processor, checking a predetermined memory location with the information or by calculating the monetary cost based on known information.

The controller also optimizes its distribution by allocating portions of the load from a more expensive processor to a less expensive processor while still maintaining an acceptable finish time to complete the job. The controller can also minimize the finish time of the processors while remaining at or below the cost ceiling.

BRIEF DESCRIPTION OF THE DRAWINGS

Further objects, features and advantages of the invention will become apparent from the following detailed description taken in conjunction with the accompanying figures showing a preferred embodiment of the invention, on which.

DETAILED DESCRIPTION

Divisible loads which can be parallel processed are becoming more common as storage capacities and the speed of processors are increasing to handle large computing jobs. The variety of different types of processors capable of processing divisible loads is also increasing dramatically. Personal computers now have a number of different types of processors which operate at many different speeds and have varying costs associated with them. These processors include the 386, 486, pentium and the P6. Also available for distributed jobs are computer platforms including work stations, mini-computers, super-computers as well as main frames. New technologies such as GaAs circuitry and chips operating at cryogenic temperatures are becoming available. These processors and platforms are becoming easier to interconnect and allow communication between one another. The increasing advances in the internet and other networks are also facilitating processor cooperation. Thus, a divisible load can be segmented and have its portions be simultaneously processed on different types of computer platforms including a 486 computer, a work station and a super-computer. Each of the individual processors or group of processors could be a computer "utility" which leases computer time to other users.

Each different type of processor and computer platform has an associated monetary cost when used to process a portion of a load. The platform includes the processor, supporting electronics and devices necessary for the processors operation (e.g., the "motherboard"). The monetary cost of a processor is based upon the computing cost whose unit is "cost per second" and the computing speed whose unit is "loads per second". The unit "load" in the computing speed parameter is of predetermined size in order to be able to compare different processors using the same parameters. The monetary cost for a processor for a unit load is the computing cost times the inverse of the computing speed to produce a parameter with the unit "cost per unit load". For example, if a 486 platform computer has a computing cost of $5/second and a computing speed of 2 loads per second, the cost of processing a unit load is $2.50. If a mini-computer platform has a computing cost of $10/second and a computing speed of 8 loads per second, the cost of processing a unit load is $1.25. Therefore, the monetary cost of the mini-computer processor is cheaper than the 486 due to its vastly increased speed relative to its computing cost.

The computing cost of a processor is based upon the operating cost of the processor and platform and/or upon the initial purchase price of the processor and platform. The operating cost component includes power costs, communication charges, maintenance to the processor and any other charges associated with the running of the processor and platform. The purchase price of the processor and platform can be depreciated over the useful life of the processor and charged as an expense to temporary users utilizing the processor as part of the load-sharing technique. An alternate calculation could be based upon the value of alternative jobs which could be processed by the processor during the time spent processing the segment of the load (a lost opportunity cost). This approach may lead to optimizing the largest rental income for each processor while minimizing the monetary costs for a single job.

Another environment where monetary cost is an important factor in the load sharing process is one in which each processor in a network has an individual predetermined charge rate. One example of this situation occurs in a university which allocates the cost of purchasing and operating a processor by internally charging out the time used on a processor to each user or department. It is advantageous for a user of the university system to use the controller which allocates divisible loads among linked processors based on the monetary cost associated with each processor. The use of the controller achieves the cheapest solution within a selected finish time. Distributing the load generally achieves a faster processing time than if the load was processed on a single processor and the controller minimizes the overall cost of processing the load. Another example of a monetary-based load sharing technique occurs in a corporation with a large number of networked processors which allows multiple loads to be optimally distributed among the processors.

Figure 1A:
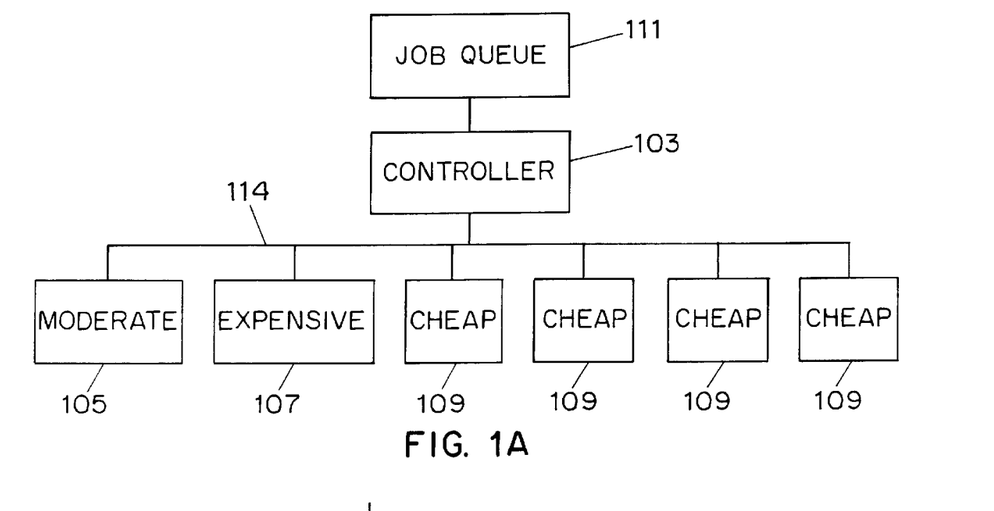
FIG. 1A shows a block diagram of a system for load sharing a divisible job among distributed processors based on monetary costs in accordance with the invention.

FIG. 1 shows a system 100 which performs a load sharing operation based upon the monetary cost of each processor. The system in the preferred embodiment includes a controller 103, a job queue 111, a network 114, a processor 107 with a high associated monetary cost, a processor 105 with a moderate monetary cost and a group of inexpensive processors 109 with relatively low monetary costs. The controller 103 can be one of the distributed processors and process a portion of the load as well as act as the controller. Alternatively, the control processor can be dedicated to properly distributing the load. The number of processors in each monetary cost group can vary. Additionally, the number of different monetary cost groups of processors can vary. In this example, the high monetary cost processor 107 is a mini-computer processor which costs $5/unit load to operate (the costs are for illustrative purposes only); the moderate cost processor 105 is a super-computer platform processor which costs $3/unit load to operate; and least expensive group of processors 109 is made up of 486 platforms which costs $1/unit load to operate. The operation cost and the speed of each processor go into the calculation of the monetary cost as described above. The job queue 111 can be any terminal, processor or other electronic unit which provides the controller with a divisible load to be apportioned in the most cost-effective manner within a selected finish time among the distributed processors.

The job queue 111 provides the controller with a divisible process to be distributed. The job queue 111 can hold multiple jobs (loads) for processing and operates in a First-In-First-Out (FIFO) manner. Alternate schemes which can be used in the job queue include using user defined priority flags, a Last-In-First-Out (LIFO) scheme or any other conventional queuing scheme. The network 114 can be a Local Area Network, the internet, a bus interconnected network or any other conventional network.

Although the super-computer platform is more expensive in operating costs, the cost per unit load is lower than that of the mini-computer processor because the magnitude of the increased processor speed offsets the higher operating costs associated with the super-computer platform. Controller 103 contains the load to be divided and distributed to other processors and also will contain the results of the completed jobs. Any job which can be divided into segments will operate with the described load sharing system.

The interaction between the controller and processors and the method employed by the system will be described in detail in connection with FIG. 2; however, a general description follows. The cheapest available processor in the system can be designated to be the controller. When the controller receives a divisible job from the job queue 111, it will first determine the monetary costs of any available distributed processor connected to the system's network which can process a portion of the load. This can be performed either by an active query to all processors on the network, or can be extracted from a data location in the controller containing the current costs of available processors. The control processor can also determine its own monetary cost if it is available to process a segment of the load. The controller can link to other individual processors or networks via a modem, dedicated line or the internet.

Figure 1B:
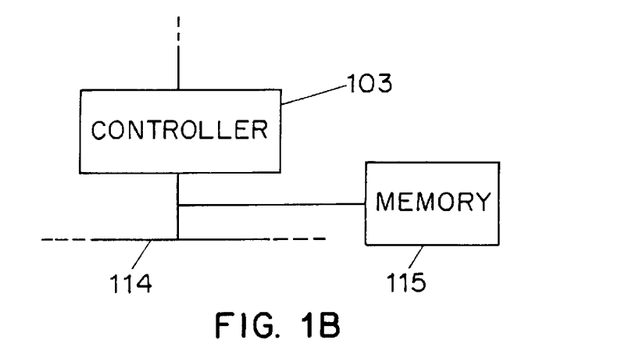
FIG. 1B shows a portion of the system in FIG. 1A further including a memory to store information regarding the distributed processors.
Figure 1C:
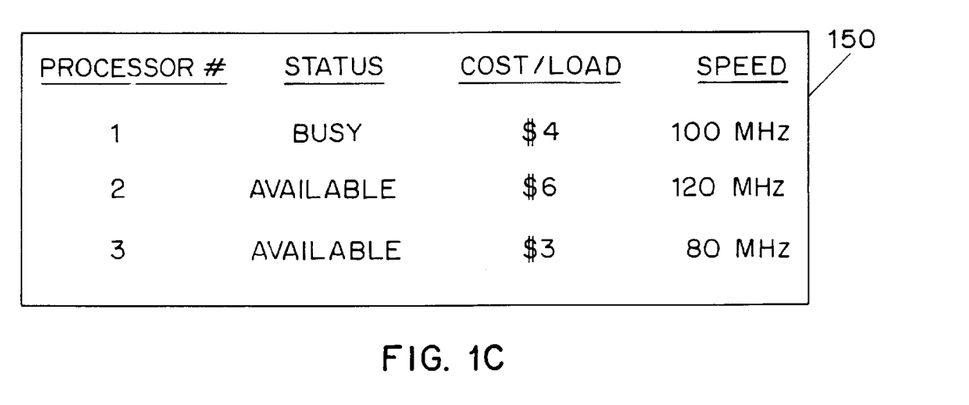
FIG. 1C shows a data file which is stored in the memory of FIG. 1B.

FIG. 1B shows an alternate embodiment of system 100 in which the controller 103 is coupled to a network and is also coupled to an external memory 115. The memory 115 contains the monetary costs and status of each processor on the network. A typical file 150 stored in memory 115 is shown in FIG. 1C. The status column is constantly updated by each of the processors in the network. The cost column is also periodically updated. Controller 103 can then select the cheapest available process in memory 115 in which to distribute the sections of a divisible load. Memory 115 could also be located in controller 103. Additionally, memory 115 can be located in a central file server or in a web site on the internet.

Once the monetary unit cost of each available processor is known, the controller 103 will select the cheapest processor to allocate the first portion of the divided load. The processor will initially allocate the maximum portion of load which can be processed on that cheapest processor within a selected finish time. The finish time is selected by the originator of the job or the controller. The processor will then allocate in succession the remaining portions of the load to the next available cheapest processors. An optimization routine can then be performed based upon an incremental increase to the maximum amount of time allowed to finish the entire process. The loads are then distributed in optimum partitions to the selected distributed processors. After processing, the processed segments of the load or intermediate results will be returned to the controller 103 from each selected distributed processor to be integrated to form a completed job result and provide the solution to a selected destination. One example of an intermediate result is an intermediate sum of that portion of numbers assigned to each processor.

The order in which the distributed processors is loaded is important if the communication time between processors in non-negligible. When the communication time is a factor and the controller cannot transmit messages in parallel, it is desirable to load the cheapest available processor first so that it can process its segment of the load for the maximum time. The most expensive processor selected for participation will receive its load last to ensure that the time that it processes the load is the least among the selecting processors in order to minimize the cost.

Figure 2:
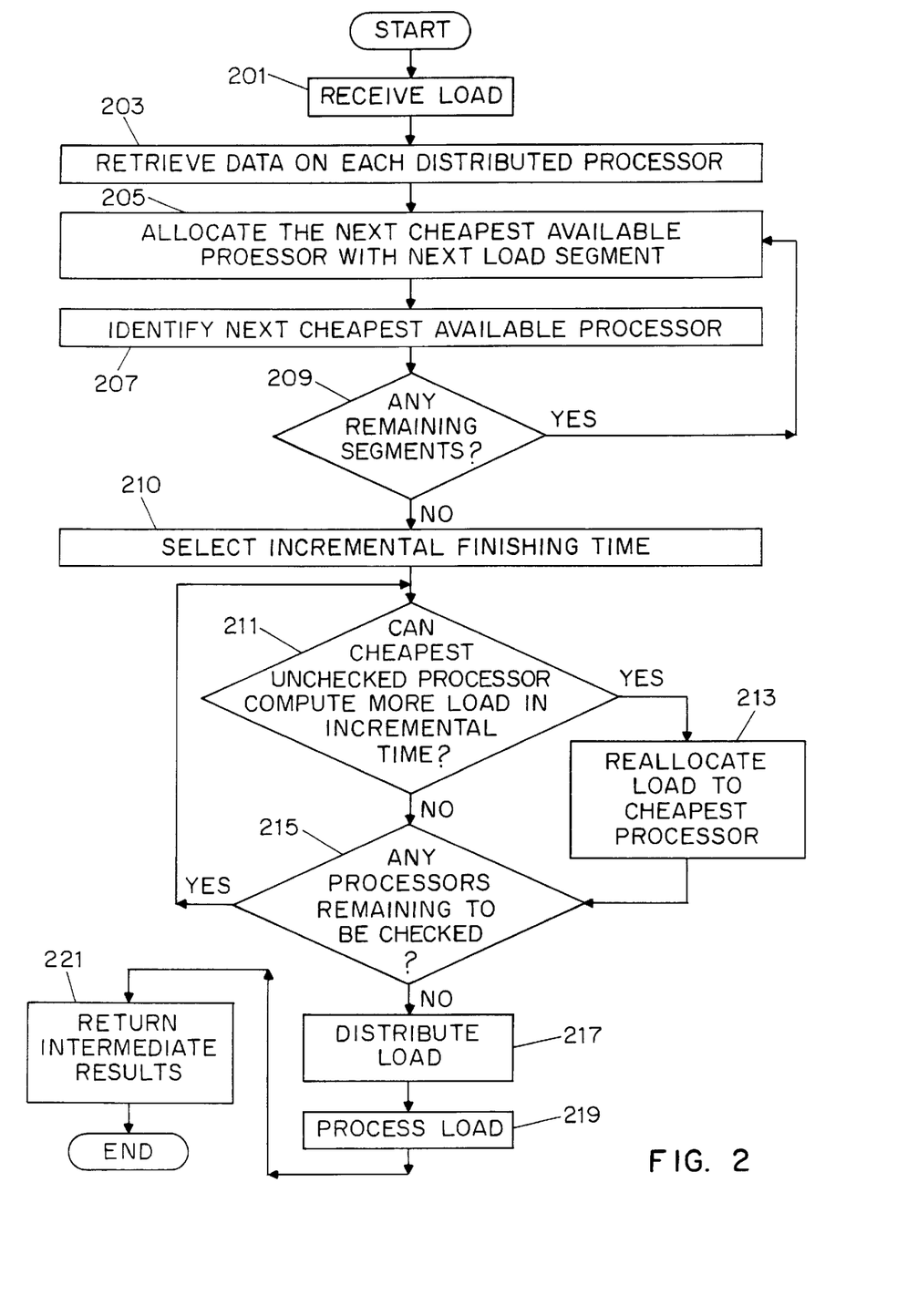
FIG. 2 shows the steps of the method for distributing a divisible computer job among two or more processors based on monetary cost.

FIG. 2 shows the steps that are performed in the system 100 when a divisible load is shared among distributed processors. In step 201, the controller 103 receives the divisible load from the job queue 111 to be distributed among at least two processors. The controller can be an independent apparatus or can be one the processors in the distributed system. The controller is preferably the cheapest processor if it is one from the distributed system.

Step 203 retrieves the monetary cost (cost per unit load) of each available distributed processor in the system. The controller may be an available processor. Some processors may be busy working on other applications and not available for the particular job. The monetary cost data may be supplied by each distributed processor after the controller 103 polls each processor on the network. Alternatively, the monetary cost data can be loaded from an internal or external memory which is periodically updated by each processor. Another method is having the distributed processors supply their operating cost data and operating speed data from which the controller 103 can calculate the effective cost per load for the processor. Additionally, the controller 103 may simply access a memory containing data including the type of each processor to allow the controller to estimate the approximate monetary cost.

The controller next divides the load into segments which can be processed separately in steps 205 to 209. The segments can be of different sizes which depends on the speed and cost of the distributed processors used. The number of segments also depends upon the selected finish time and the types of available processors used. The selected finish time data can be sent with the divisible load to the controller, can be predetermined for the system, or can be determined by the controller. Transmission time to the processors is normally negligible due to the relatively large size of the loads but becomes non-negligible when the divided segments of the load are very small requiring that the communication time be considered in the optimization technique. One example of a divisible load is a list of data to be searched that can be divided into three segments and processed on three different distributed processors, where each processor performs a search routine on its particular segment. The assigning and optimization of the load distribution is performed prior to physically sending the load segments to each distributed processor.

Step 205 allocates the cheapest available processor (based on the cost/unit load) in the network with a divided segment of the load. When the initial cheapest processor is identified, it will be allocated with the first divided segment of the load. The load will be divided so that the segment will fully utilize the cheapest processor for the entire selected finish time constraint. The proportional segmentation can be calculated based upon the speed of the distributed processor which can be found in the similar manner as the monetary cost. The distributed processor just allocated will then change its availability status to "busy" to indicate it is not available for other loads. Then, in later steps, subsequent available distributed processors with the lowest monetary cost will be allocated with the remaining segments of the load.

Step 207 identifies the next cheapest available processor which is to be assigned an unprocessed segment of the load. The processors which already have been allocated a segment of the load are no longer available. A complete list of available processors could be formed and updated in step 203 so that step 207 will have already been performed. However, in the preferred embodiment, the network is checked for new additional processors which became available and which may have a cheapest monetary cost.

Step 209 checks if there is any remaining segments of the load to be processed. If there is, then the method jumps back to step 205. If there is not, then the method continues with step 210.

Steps 210 to 215 optimizes the original load sharing allocation to distributed processors in order to provide the lowest monetary cost processor with a larger share of the load while extending the finish time incrementally. This optimization will drive down the overall cost of processing the load thus becoming more cost efficient.

Step 210 selects the amount of incremental time which will increase the finish time while reducing the overall monetary cost of processing the distributed job. The controller receives the selected incremental time from the originator of the job via the network or an input device connected to the controller. The controller can also use a default incremental time if the user wishes to reduce costs. The user may decide that an extra minute of processing finish time is acceptable if the overall costs can be reduced by a large amount, e.g., by twenty percent.

Step 211 checks if the cheapest processor used to load share the job can process an additional portion of the load within the selected increased finish time constraint. A divisible load by definition can be subdivided into as many parts as necessary. For example, if the distributed load is initially segmented and allocated to be completely processed in three minutes to reduce costs, and the selected incremental finish time is five seconds, the load controller 103 will reallocate a divisible portion of the load equal to five seconds of processing time from the most expensive processor to the least expensive processor. If the cheapest processor is fully allocated for the selected incremental finish time period, the next cheapest processor is checked to determine if it could process a portion of the most expensive processor's load within the incremented time period.

Step 213 reallocates a portion of the most expensive processor's load to a cheaper processor's load which will be able to complete execution by the initial finish time plus the incremental finish time. If the segment of the load assigned the expensive processor is completely reallocated to cheaper processors, the expensive processor will no longer be used and will become available for other jobs in the system.

Step 215 determines if there are any processors remaining which have not had their loads reallocated during the optimization technique. If there are additional cheaper processors not yet checked and which can process additional loads within the incremental finish time, the method jumps back to step 211. If there are no unchecked processors, then the optimization is complete and the method continues with step 217.

Step 217 distributes the load to the selected processors using the determined allocation in the previous steps. The cheapest available processor will be sent its allocated portion first and the other selected processors will be sent their portion in an ascending order according to the monetary cost of each processor. Alternatively, smaller portions of each allocated segment can be sent to each processor so that the processors can begin to operate on their load segment sooner. The controller would keep distributing the remaining smaller segments until all the allocated segments were distributed.

Step 219 processes each of the allocated load portions on the assigned distributed processors. Each load is processed on a distributed processor as soon as it is received from the controller.

Step 221 returns the intermediate results of all the segments of the divisible loads which were processed on the distributed processors to the controller. This function may entail further calculations such as adding the intermediate results together or concatenating the resultant data from each processor together to form a solution. The job result is then complete. It can be stored in a memory or delivered back to the originator of the job or selected destination.

Figure 3:
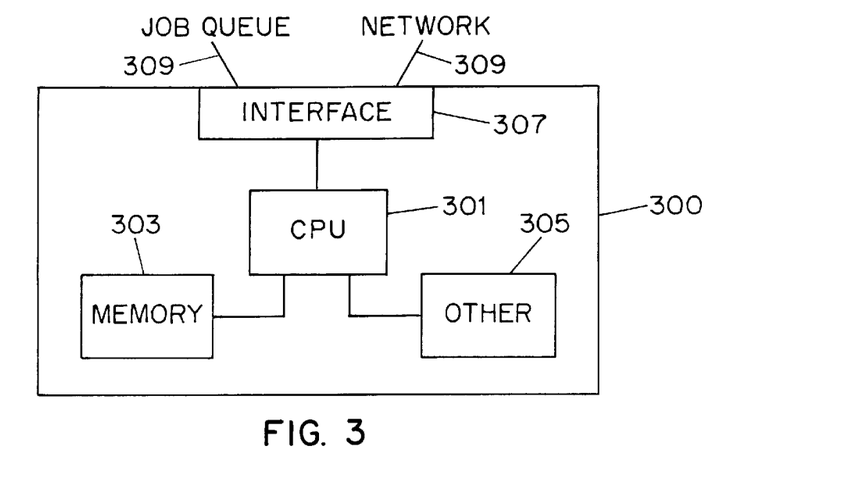
FIG. 3 shows a block diagram of a controller which operates in the system of FIG. 1.

FIG. 3 is a block diagram of a load sharing controller used in the present invention. The controller 300 includes a central processing unit 301, a memory 303, other conventional electronics necessary for the operation of the controller 305 and interface 307. Each of the components are coupled by conventional connectors. Interface 307 is connected by transmission lines 309 to both the job queue 111 and the network 114. Alternatively, job queue 111 can be a part of controller 103 using memory 303. The interface 307 may be large enough for both job queue 111 and network 114 to be simultaneously connected or interface 307 may be have a switching ability. The load is transmitted from the job queue 111 over transmission lines 309 to interface 307. The load is then stored in memory 303 and partitioned into smaller loads to be assigned among a number of distributed processors.

The CPU 301, which controls the operations of the controller 300, determines the available distributed processors connected to network 114 by either polling the processors or checking a predesignated memory location listing the cheapest available processors. The loads are then allocated to each of the distributed processors, starting with the cheapest processor. CPU 301 then checks the possibility of the cheaper processors to take on additional segments of the load to be completed within the selected incremented finish time constraint. If the cheaper processor can take on the additional load within the incremented time constraint, the segments of the load are reallocated from the more expensive processors to the less expensive processors. Once the segmentation has been optimized, the load segments are sent to each distributed processor through interface 307 and along transmission lines 309.

The controller 300 can be one of the processors which is allocated a portion of the divided load. CPU 301 would process its allocated segment after it had performed the function of the controller.

Figure 4:
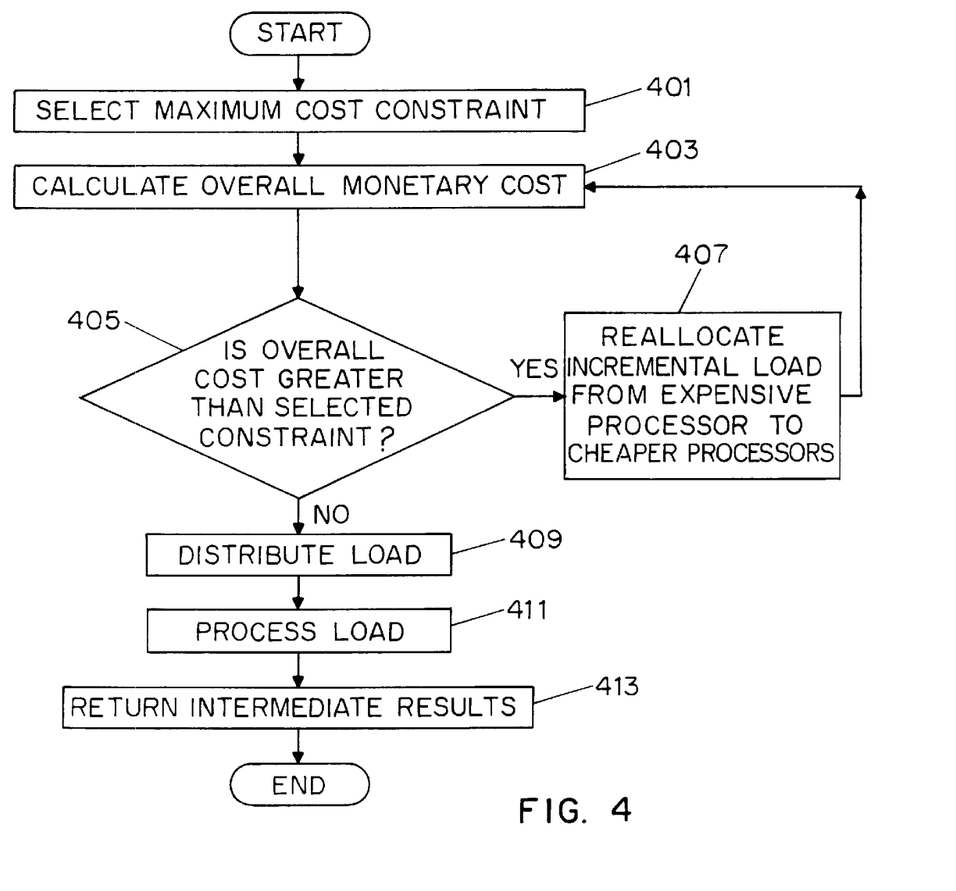
FIG. 4 shows a method to optimize the finish time while remaining within a selected cost constraint.

FIG. 4 shows the steps of a technique for minimizing the finish time of the load sharing distribution by a controller when a final cost ceiling is selected by the originator of the job. This technique is used, for example, when a user wants to process a divisible load the quickest way but for under $25. The controller will receive the cost ceiling data and allocate the load accordingly to meet the cost ceiling while extending the finish time as little as possible.

Step 401 allows the user to select a maximum cost constraint for a particular job to be processed in a distributed system. The cost constraint information can be sent from the job queue with the divisible load to the controller 103 or can be entered directly into the controller via a keyboard, data file or other input device. The cost constraint can also be standard for all jobs from a particular user or group or users. For example, a user can require that all jobs should be processed for under $10.

Step 403 calculates the overall cost of the divisible job to be distributed among the available processors in the network. The overall cost is equal to the summation of the monetary cost (cost/unit load) of each processor times the fraction of the load being processed on that processor times the size of the overall load. The cost is minimized by placing as much of the load on the processors with a low monetary cost while still completing the processing within an acceptable finish time.

Step 405 determines if the calculated overall cost is greater than the selected cost constraint. If the overall cost is greater, the technique jumps to step 407. If the overall cost is not greater, then the cost is within the selected cost constraint and the optimization technique is complete. The technique then continues with step 409.

Step 407 reallocates an incremental portion of the load from the most expensive processor to the cheaper processors (which reduces cost but most likely decreases speed). In order to minimize the finishing time given a cost ceiling, all the processors allocated segments of the load must stop processing at the same time. Thus each of the cheaper processors will receive a portion of the reallocated load based upon the speed of the individual processor receiving the incremental load. A processor X that is twice as fast as a processor Y will receive a larger portion of the incremental load because it can process more of the load while being able to finish processing its load at the same time as processor Y. Thus, the overall finishing time will be marginally increased but still minimized for a given cost ceiling. The size of the incremental portion reallocated between processors depends on the actual size of load and could range, for example, from 1% to 5% to 100% of the load segment. A load reallocation to a cheaper processor will by definition decrease the overall cost of the processing the load. The process then continues with step 403 to determine if the decrease in cost is sufficient to make the overall cost become equal to or below the cost ceiling.

Step 409 distributes the load to the selected processors using the determined allocation in the previous steps. The cheapest available processor will be sent its allocated portion first and the other selected processors will be sent their portion in an ascending order according to the monetary cost of each processor. Alternatively, smaller portions of each allocated segment can be sent to each processor so that the processors can begin to operate on their load segment sooner. The controller would keep distributing the remaining smaller segments until all the allocated segments were distributed.

Step 411 processes each of the allocated load portions on the assigned distributed processors. Each load is processed on a distributed processor as soon as it is received from the controller.

Step 413 returns the intermediate results of all the segments of the divisible loads which were processed on the distributed processors to the controller. This function may entail further calculations such as adding the intermediate results together or concatenating the resultant data from each processor together to form a solution. The job result is then complete. It can be stored in a memory or delivered back to the originator of the job or selected destination.

When optimizing the finish time of a load allocation without regard for the monetary cost, all of the distributed processors must stop processing at the same time. If this was not the case, then some of the processors would be idle while other processors are busy. However, when monetary costs are a factor, it may be more efficient to not use the more expensive processors while the less costly processors operate for a greater time period. The technique for optimally allocating a divisible load based on monetary costs is different than when based simply on speed of the processors and their finish time.

Figure 5:
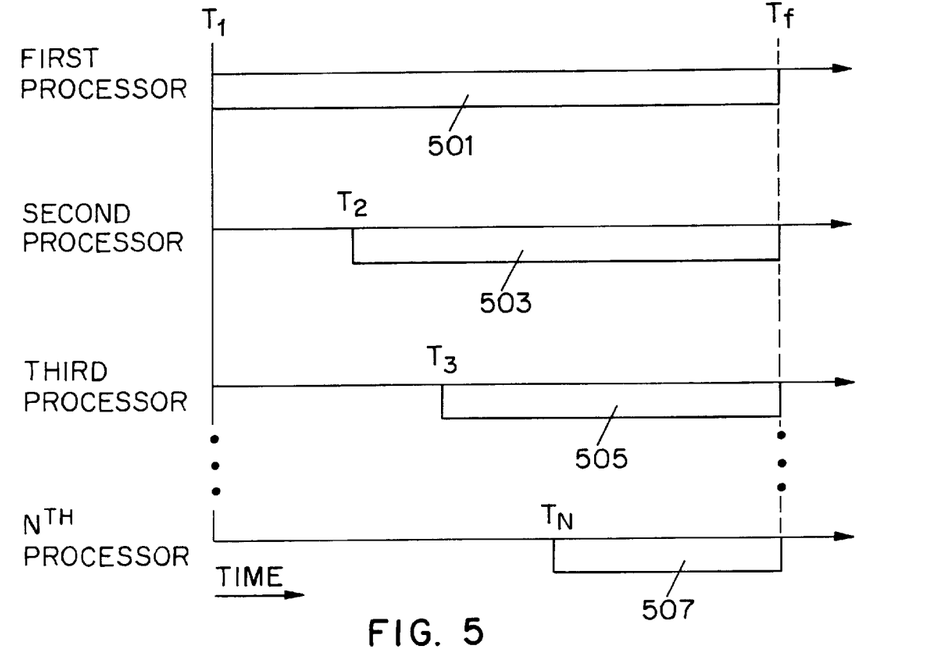
FIG. 5 is a timing diagram of the initial allocation of a distributed load in accordance with the invention.

FIG. 5 shows a timing diagram of N inter-connected processors participating in an application of the load sharing technique described in FIG. 2. In this example, the first processor unit 501 acts as the both the controller and a processor which operates on a segment of the divisible load. Each processing unit in this example contains two separate processors, a main processor and a front end processor for transmitting and receiving data simultaneously with the operation of the main processor. In this example, the load is divided and sent in a serial manner to each of the other distributed processors. The loads are apportioned so that the finish time of all the loads occur at the same time. FIG. 5 shows the computation time of a first processor which acts as the controller and immediately processes its portion of the load. The process time block 501 for the first processor starts at $t=T_1$ and processes the load segment until $t=T_f$. The other processors are transmitted their respective load shares in succession. The process time for the second processor (as shown by processing block 503) starts at time $T_2$ and processes until $T_f$. The process time for the third processor (as shown by processing block 505) starts at time $T_3$ and processes until $T_f$. The process time for the Nth processor (as shown by processing block 507) starts at time $T_N$ and processes until $T_f$. The delay of the start of each processor is due to the successive transmission times of the load segments from the controller to each processor. The initial allocation ensures the cheapest monetary cost while still finishing the entire job by $T_f$ (excluding the time to transmit the results back to the controller). The timing diagram corresponds to the operation of steps 201 to 209 of FIG. 2 before further optimization and reduction to the monetary cost of the job.

Figure 6:
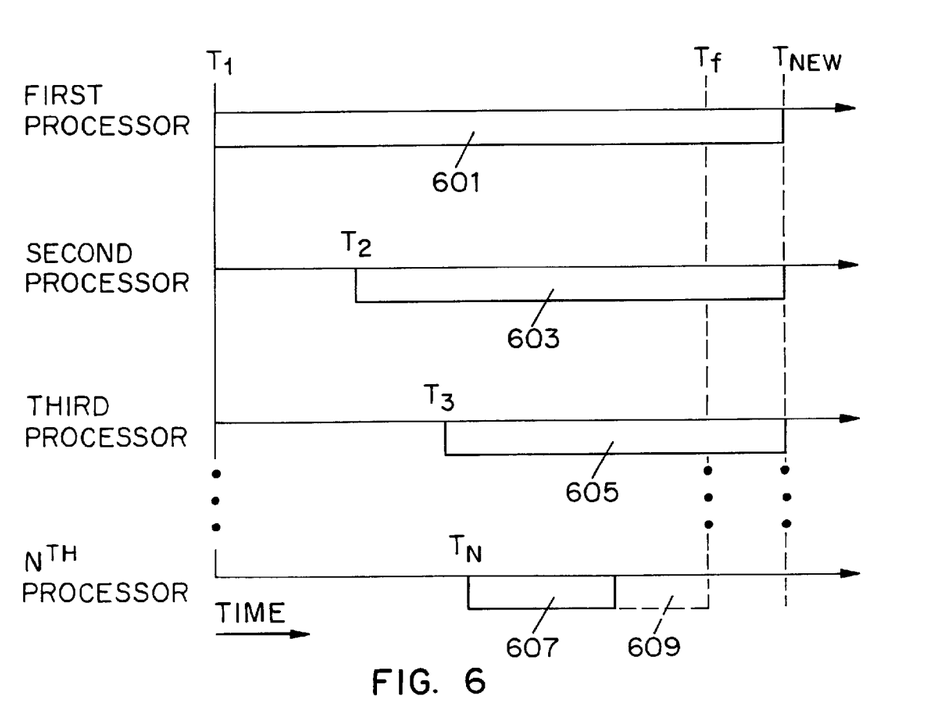
FIG. 6 is a timing diagram of the distributed load after it has been optimized to minimize the overall monetary cost when the finish time is increased incrementally.

FIG. 6 shows a timing diagram of N inter-connected processors when further reducing the monetary cost by incrementally increasing the finish time to an acceptable level. In this diagram, the finish time after the initial allocation is extended to $T_{new}$. The first processor now processes for a longer time as shown by processing block 601 starting at time $T_1$ and running until $T_{new}$. The extra load was reallocated from the most expensive processor $T_N$ and added to the load of the first processor. Other cheaper processors also had their processing loads extended (as shown in processing blocks 603 and 605) by reallocating portions of loads from the expensive processors. The expensive Nth processor now has a finish time less than the original time $T_f$ (as shown by processing block 607) because a portion of its load (shown as dashed portion 609) has been reallocated to the other processors. The result is that the overall monetary cost of the job decreases while the finish time is increased incrementally. The monetary cost/finish time tradeoff can be decided by the job provider and indicated to the controller through transferred data, data protocols or separate input to the controller.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

We claim:

1. A system for distributing an incoming computing job comprising:

a plurality of processors, each with an associated monetary cost;

a queue for receiving said incoming computing job;

a controller for dividing said received computing job into segments and allocating said segments to at least two of said processors; and a network for connecting said processors and said controller;

wherein said controller retrieves associated monetary cost data for said plurality of processors and identifies at least one processor with a low said monetary cost, wherein said allocation of said segments is responsive to said retrieved associated monetary cost data of each said processor and wherein said controller further reallocates said segments to said processors in order to minimize said computing job's overall monetary cost.

2. A system of claim 1, wherein said controller is one of said processors.

3. The system of claim 2, wherein said controller is not allocated at least one said segment.

4. The system of claim 1, wherein said processors include at least two different types of said processors.

5. The system of claim 1, wherein said monetary cost of each said processor is responsive to said processor's speed and said operating cost of said processor.

6. The system of claim 5, wherein said operating cost of each said processor is further responsive to said purchase price of said processor.

7. The system of claim 1, wherein said reallocation occurs from said processors with high monetary cost to said processors with low monetary cost.

8. A The system of claim 1, wherein said controller further reallocates said divisible jobs among said processors to reduce said computing job's monetary cost below a selected cost constraint.

9. The system of claim 1, wherein said reallocation further minimizes said computing job's finish time.

10. The system of claim 1, wherein substantially all of said processors' segment finish times are equal.

11. The system of claim 1, wherein said allocating of said segments is further responsive to each said processor's processing speed.

12. A method for distributing a computing job among a plurality of processors comprising the steps of:
    determining a monetary cost associated with each said processor;
    dividing said computing job into segments; and
    allocating said segments to said processors responsive to said monetary cost of each said processor.

13. The method of claim 12, further including the step of identifying one of said processors with a low said associated monetary cost.

14. The method of claim 13, wherein said allocating step allocates one of said segments to said identified processor.

15. The method of claim 12, wherein said determining step polls each of said processors to determine said monetary cost.

16. The method of claim 15, further including the step of polling each of said processors to determine its availability and wherein said allocation step is responsive to said availability.

17. The method of claim 12, wherein said determining step checks a predesignated memory location which stores said monetary cost of each said processor.

18. The method of claim 17, further including the step of reading a predesignated memory location which stores each of said processor's availability and wherein said allocating step is responsive to said availability.

19. The method of claim 12, wherein said monetary cost of each of said processors is at least responsive to said operating cost of said processors.

20. The method of claim 19, wherein said monetary cost is further responsive to said purchase price of said processors.

21. The method of claim 12, further including the step of optimizing said distribution of said divisible job to minimize said computing job's overall monetary cost.

22. The method of claim 21, wherein said optimizing step includes reallocating portions of said segments distributed from said processors with high said associated monetary costs to said processors with low said associated monetary costs.

23. The method of claim 22, wherein said computing job's finish time is incrementally extended during said optimizing step.

24. The method of claim 12, further including the step of optimizing said distribution of said divisible job to reduce said computing job's monetary cost below a selected cost constraint.

25. The method of claim 24, wherein said optimizing step includes reallocating portions of said segments distributed from said processors with high said associated monetary costs to said processors with low said associated monetary costs.

26. The method of claim 24, wherein said optimizing step further minimizes said computing job's finishing time.

27. The method of claim 12, further including the step of distributing said allocated segments and processing said allocated segments on said allocated processors.

28. The method of claim 12, wherein substantially all of said allocated processors' segment finish times are equal.

29. The method of claim 12, wherein said allocating step is further responsive to each said processor's processing speed.

30. A method for distributing a received computing job among a plurality of processors with associated monetary costs using a monetary cost ceiling, comprising the steps of:
    selecting said monetary cost ceiling;
    determining said monetary cost associated with each said processor when said computing job is received;
    dividing said computing job into segments and allocating said segments to said processors responsive to said monetary cost of each said processor and said monetary cost ceiling; and
    distributing said segments to said processors when a total monetary cost for processing said computing job comprising said determined monetary costs of said processors with allocated segments is at or below said selected monetary cost ceiling.

31. The method of claim 30, wherein said allocating said segments step is further responsive to each said processor's processing speed.

32. The method of claim 31, wherein said segment allocated to said processor with the greatest associated monetary cost is reallocated to said other allocated processors.

33. The method of claim 32, wherein said other allocated processors all finish processing said allocated segments at the same time.

34. The method of claim 30, wherein said processors are comprised of at least two different types of processors.

35. The method of claim 30, wherein said dividing step further minimizes said computing job's finishing time.

36. A controller for distributing a received computing job comprising:
    means for interfacing with a plurality of processors when said computing job is received, wherein each said processor has an associated monetary cost;
    means for determining said monetary costs of said processors and for segmenting said computing job into segments to be allocated among said processors, wherein said allocated processors are selected based on said monetary costs, said determining means being coupled to said interfacing means; and
    means for sending at least one of said allocated segments to at least one of said selected processors and for receiving intermediate results from said selected processors via said interface means.

37. The controller of claim 36, wherein said processor are comprised of at least two different types of processor.

38. The controller of claim 36, wherein said monetary cost of each said processor is responsive to said processor's operating cost.

39. The controller of claim 38, wherein said monetary cost is further responsive to said processor's purchase price.

40. The controller of claim 36, wherein said controller has an associated monetary cost and is capable of being allocated one of said segments.

41. The controller of claim 37, further comprising means for reallocating said segments to said processor in order to minimize said computing job's overall monetary costs.

* * * * *